Figure 1:
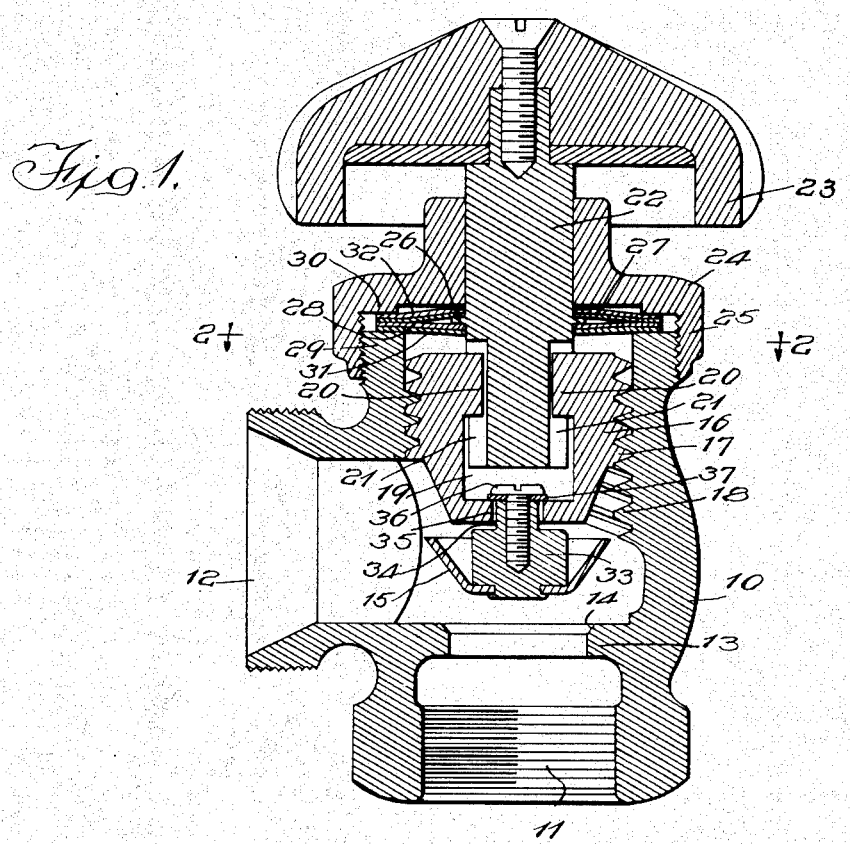

May 23, 1933.  H. L. JOYCE  1,910,994

VALVE

Filed May 21, 1930

Witness:
William P. Kilroy

Inventor:
Harold L. Joyce
By Hill & Hill
Attys.

Patented May 23, 1933

1,910,994

UNITED STATES PATENT OFFICE

HAROLD L. JOYCE, OF CHICAGO, ILLINOIS, ASSIGNOR, BY MESNE ASSIGNMENTS, TO JAS. P. MARSH CORPORATION, OF CHICAGO, ILLINOIS, A CORPORATION OF ILLINOIS

VALVE

Application filed May 21, 1930. Serial No. 454,429.

The invention relates to valves and has among its principal objects the provision of a valve structure of a character which facilitates assembly in manufacture, and which may be quickly disassembled should repairs be found necessary.

The invention has among other objects the provision of a construction whereby the valve head may be adjusted and held relatively to its seat and have the valve stem separated therefrom, to thereby permit the valve to be packed or otherwise repaired without necessitating shutting down the system in which the valve is located.

The invention has as a further object the provision of an improved packing means for preventing leakage between the interior of the valve body and the stem.

Another object of the invention is to provide the valve head with an element which forms part of a connection between the stem and the valve head, said connection providing means whereby the stem may be disconnected from the valve head with the valve head in a position to effect a closed or open condition of said valve, said connection also providing an element of means whereby the valve is moved to open and closed position upon rotation of the valve stem.

Another object of the invention is to provide a valve with means whereby the stem of the valve may be removed from the body of the valve independently of the valve head, and in which the valve head may be removed from the interior of the body, should this be found necessary.

Another object of the invention is to provide a connection between the valve and the stem whereby the valve is moved longitudinally in opposite directions relatively to the stem upon rotation of the latter.

Another object of the invention is to provide an improved means for preventing leakage between the body and the stem and to employ a plurality of discs for this purpose, which cooperate with an annular shoulder provided upon the stem, the discs being preferably formed of some material having high wear resisting and non-corrosive qualities.

Another object of the invention is to combine with said discs, means preferably in the form of discs of a resilient character, which cooperate with the first-mentioned discs to prevent leakage at this point of the structure, said discs further functioning to assist in maintaining the valve stem in proper relation to other elements of the device.

An additional object of the invention is to provide a connection between the valve head and said element forming part of said connection between the head and stem, whereby said element may be rotated relatively to said valve head.

The invention has these and other objects, all of which will be explained in detail and more readily understood when read in conjunction with the accompanying drawing which illustrates one embodiment of which the invention is susceptible, it being obvious that changes and modifications may be resorted to without departing from the spirit of the appended claims forming a part hereof.

Figure 2:
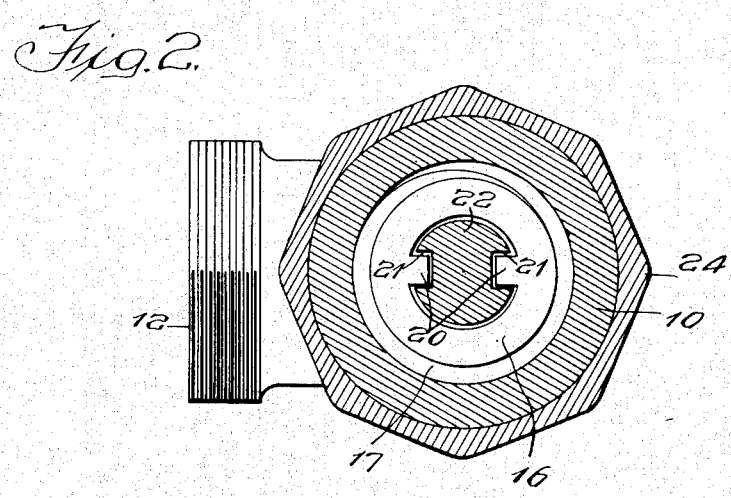

In the drawing, Fig. 1 is a central longitudinal section of a valve embodying the features of the invention; and Fig. 2 is a section taken on line 2—2 of Fig. 1.

The structure whereby various features of the invention are accomplished, is shown and described in my application, Serial No. 442,192, filed April 7, 1930.

The structure herein shown contemplates the provision of a valve body 10 having openings 11 and 12, either of which may provide an inlet or an outlet opening to and from the valve. The valve body is provided with an annular flange 13 which forms a seat 14 with which the valve head 15 cooperates to control the passage of fluid from one of the openings, such as 11 to the other such as 12. It is understood that the openings 11 and 12 are threaded so as to permit pipe connections or fittings to be associated with the valve body.

The valve head 15 is carried by an element 16 which is provided on its exterior with preferably quick acting threads 17 which cooperate with threads 18 provided interiorly of the valve body. This element 16 is formed to provide the longitudinal recess 19 which has a plurality of inwardly projecting lugs 20, the latter of which are designed to respectively enter slots 21 provided in the adjacent end of the valve stem 22. The opposite end of said stem has a hand wheel 23 suitably connected thereto, to thereby provide means for rotating said stem and actuating said valve. It is manifest that the structure thus far described provides means for opening and closing the valve without causing longitudinal movement of the valve stem; in other words, the structure provides what is known as a valve having a non-rising valve stem.

A bonnet 24 is mounted upon the valve stem 22 and is threaded as at 25 for cooperation with threads provided on the body of the valve adjacent the bonnet. It is manifest that should it be found desirable for any reason to disconnect the valve stem 22 from the remaining structure, all that is necessary is to disconnect the bonnet 24 from the body of the valve which allows the stem to be removed from the body without disturbing the adjusted position of the element 16 and the valve 15 carried thereby. It is further manifest that when the stem 22 is rotated through the medium of a force supplied to the hand wheel 23, the element 16 will, by virtue of cooperation between the lugs 20 and the slots 21, cause rotation of the element 16, which causes movement of said element and the valve 15 longitudinally and relatively to the stem 22. It is further evident that when the bonnet and the stem are removed from the body the element 16 and the valve 15 may be left in any one of its adjusted positions and may, if found desirable or necessary, be removed from the interior of the body merely by causing its rotation which will position said element and valve, so that it may be extracted from the interior of the body through the opening normally closed by the bonnet 24.

As before stated, the invention has as one of its features, a means for sealing or packing the stem 22 against leakage. To this end, the stem 22 is provided with an annular projection 26 and discs 27 and 28 are employed, which are respectively located upon opposite sides of the annular projection 26 and extend from the stem to the rim 29 of the body of the valve, the periphery of the discs being held between the rim 29 and an annular projection 30 provided upon the underside of the bonnet. These discs are preferably formed of some high wear resisting material, which is preferably also of a non-corrosive character and are reenforced by means of the discs 31 and 32, which are respectively located upon the outside of the discs 27 and 28, it being understood that the periphery of these last mentioned discs is also held between the annular projection 30 provided upon the under face of the bonnet and the rim 29 of the body of the valve. The means just described provides a simple and efficient arrangement for preventing leakage and wear between the stem and the discs and in addition, provides a means whereby access may be readily had to the element 16 should this, at any time, be found necessary.

It is further evident that should it be found necessary to replace the discs, all that is necessary is to unscrew the bonnet from the body of the valve which will allow the stem, hand wheel, and packing discs to be separated from the element 16 and the valve 15, after which the discs such as 28 and 31, located on one side of the annular projection 26 may be removed from this end of the stem. To remove the discs 27 and 32, the hand wheel 23 is separated from the stem which will allow these last mentioned discs to also be removed from the stem.

The valve 15 may be connected with the element 16 in any suitable manner; the means herein shown includes a member 33 to which the valve 15 is riveted, the member 33 having the reduced portion 34, which is passed through an opening 35, provided in one end of the element 16. A screw 36 is threaded into the reduced portion 34 of the member 33 and thus, through the agency of a washer 37, the valve 15 is held relatively to the element 16.

From the foregoing description of the invention, it is manifest that the discs and the projection 26 provided upon the stem 22 of the valve, provide a simple and efficient means for sealing the valve stem against the occurrence of leakage between the interior of the valve body and the bonnet. It is further evident that the arrangement is such that the stem and the discs may be removed from the body of the valve merely by unscrewing the bonnet from the body of the valve, which by virtue of the rotatable connection provided between the bonnet and the stem, this removal may be accomplished without interfering with the adjusted position of the valve 15 and the element 16 to which the valve is connected.

It is also evident that when the stem and the bonnet, together with the discs, are separated from the body of the valve, that access may readily be had to the elements mounted on the stem or the element 16 which is rotatably mounted within the body 10. If it is found necessary to remove the element 16 and the valve 15 connected therewith, this may be accomplished merely by rotating the element 16 in a manner to advance said element through the opening closed by the bonnet 24. In addition to the above, it is evident that the valve 15 may be moved through various positions relatively to its seat merely by rotation of the stem 22 which, by virtue of the threads 17 and 18, causes the element 16 to be rotated and moved longitudinally of the stem.

Having thus described the invention, what I claim and desire to cover by Letters Patent is:

1. In a device for preventing leakage between a valve body and the rotatable stem of a valve, the combination of an annular projection on the stem and a plurality of discs located upon opposite sides of said projection, one of said plurality of discs on each side being in engagement with said projection and providing a wear plate and another of said plurality of discs on each side engaging said first mentioned disc and providing means for maintaining said first mentioned disc in engagement with said annular projection.

2. In a valve, the combination of a valve body having a valve seat, a valve arranged within said body, a stem for actuating said valve, a bonnet through which said stem projects, said stem having an annular projection, discs arranged upon opposite sides of said projection engaging with said projection, the periphery of said discs being arranged between said body and bonnet and discs arranged between said body and bonnet engaging said first mentioned discs providing means for maintaining said first mentioned discs in engagement with said annular projection of said stem.

3. In a device for preventing leakage between a valve body and the stem of a valve the combination of an annular projection provided upon the stem of said valve and a plurality of discs located upon opposite sides of said projection, one of said plurality of discs located upon opposite sides of said projection engaging said projection, another of said plurality of discs located upon opposite sides of said projection providing means for engaging said first mentioned disc adjacent the projection and maintaining said first mentioned disc in engagement with said projection.

4. In a device for preventing leakage between a valve body and a rotatable stem of a valve, the combination of an annular projection on the stem, a disc located upon opposite sides of said projection, and a disc engaging one of said first mentioned discs and providing means for maintaining said one of said first mentioned discs in engagement with said annular projection.

In witness whereof, I hereunto subscribe my name this 17th day of May, A. D., 1930.

HAROLD L. JOYCE.